US008169516B2

(12) United States Patent
Feng et al.

(10) Patent No.: US 8,169,516 B2
(45) Date of Patent: May 1, 2012

(54) ELECTO-OPTICAL COLOR IMAGING SYSTEMS HAVING STRONG LATERAL CHROMATIC ABERRATION COMPENSATED BY DIGITAL IMAGE PROCESSING

(75) Inventors: Guotong Feng, Mountain View, CA (US); M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 658 days.

(21) Appl. No.: 12/218,883

(22) Filed: Jul. 18, 2008

(65) Prior Publication Data

US 2010/0013966 A1    Jan. 21, 2010

(51) Int. Cl.
*H04N 9/093*    (2006.01)
(52) U.S. Cl. .................. 348/263; 348/241; 348/335
(58) Field of Classification Search .......... 348/241, 348/263, 335
See application file for complete search history.

(56) References Cited

U.S. PATENT DOCUMENTS

| 6,323,934 | B1 * | 11/2001 | Enomoto ............... 355/40 |
| 6,870,564 | B1 | 3/2005 | Burns |
| 7,245,319 | B1 | 7/2007 | Enomoto |
| 7,321,685 | B2 | 1/2008 | Okada et al. |
| 7,362,895 | B2 | 4/2008 | Masumura et al. |
| 2001/0030697 | A1 | 10/2001 | Dischert et al. |
| 2004/0240726 | A1 * | 12/2004 | Stavely et al. ............ 382/162 |
| 2005/0160112 | A1 * | 7/2005 | Makela et al. ............ 707/103 R |
| 2008/0240709 | A1 * | 10/2008 | Nakamura ............... 396/529 |
| 2008/0291447 | A1 * | 11/2008 | Vakrat et al. ............ 356/364 |

OTHER PUBLICATIONS

Boult, T.E., "Correcting Chromatic Aberrations Using Image Warping," 1992 IEEE Computer Society Conference on Computer Vision and Pattern Recognition, Proceedings CVPR '92, Jun. 15-18, 1992, 15 pages.
Garcia, J. et al., "Chromatic Aberration and Depth Extraction," Proceedings of the International Conference on Pattern Recognition (ICPR '00), IEEE, 2000, 4 pages.
Jackowski, M. et al., "Correcting the Geometry and Color of Digital Images," IEEE Transactions on Pattern Analysis and Machine Intelligence, Oct. 1997, pp. 1152-1158, vol. 19, No. 10.
Kozubek, M. et al., "An Efficient Algorithm for Measurement and Correction of Chromatic Aberrations in Fluorescence Microscopy," Journal of Microscopy, Dec. 2000, pp. 206-217, vol. 200, Pt. 3.
Mallon, J. et al., "Calibration and Removal of Lateral Chromatic Aberration in Images," Jan. 17, 2006, Elsevier Science, pp. 1-19.
Willson, R.G. et al., "Dynamic Lens Compensation for Active Color Imaging and Constant Magnification Focusing," The Robotics Institute, Carnegie Mellon University, Nov. 1991, 51 pages.
Willson, R.G., "Modeling and Calibration of Automated Zoom Lenses," Ph.D. Dissertation, The Robotics Institute, Carnegie Mellon University, Jan. 1994, 189 pages.

* cited by examiner

*Primary Examiner* — Gevell Selby
(74) *Attorney, Agent, or Firm* — Fenwick & West LLP

(57) ABSTRACT

A spatially-varying sharpening filter and a color registration module compensate for significant lateral color in poorly corrected optics. In one aspect, a color imaging system includes image-forming optics, a sensor array and a processing module. The processing module includes a color registration module and a spatially-varying sharpening filter. The image-forming optics suffers from lateral chromatic aberration. The sensor array captures color pixels of the chromatically aberrated optical image. The spatially-varying sharpening filter sharpens the image (e.g., reduces the blurring caused by lateral color), and the color registration module realigns different color channels of the image.

26 Claims, 6 Drawing Sheets
(2 of 6 Drawing Sheet(s) Filed in Color)

ELECTO-OPTICAL COLOR IMAGING SYSTEMS HAVING STRONG LATERAL CHROMATIC ABERRATION COMPENSATED BY DIGITAL IMAGE PROCESSING

BACKGROUND OF THE INVENTION

1. Field of the Invention

This invention relates to color imaging systems with strong lateral chromatic aberration, for example for wide angle systems and inherently dispersive systems.

2. Description of the Related Art

Lateral color is one type of wavelength-specific or chromatic aberration. Lateral color characterizes the wavelength-dependent focal length of an optical system due to dispersion in the optical system. Dispersion in the optical system causes rays of light to refract at optical surfaces in a wavelength-dependent fashion. This wavelength-dependent variation becomes more severe as the incidence angle on a particular surface increases. Consequently, lateral color is more problematic in wide angle systems where rays strike the first lens surface at extreme angles of incidence. Lateral color can also be problematic in optical systems that include diffractive optical elements (DOE) due to the inherently dispersive nature of DOEs.

Typically, optical systems are designed to minimize lateral chromatic aberration, often at great expense in terms of optical glass costs, lens system size, and number of lens elements. Perhaps the most difficult optical aberration to correct in super-wide angle imaging systems is that of lateral color. One traditional method involves using large curved lens elements at the front of the lens system combined with a negative achromatic later in the optical train. However, this adds to the cost and complexity of the lens system.

Thus, there is a need for color imaging systems where the effects of lateral color can be controlled without requiring expensive, large or complex lens systems.

SUMMARY OF THE INVENTION

The present invention overcomes the limitations of the prior art by using a spatially-varying sharpening filter and a color registration module to compensate for significant lateral color in poorly corrected image-forming optics.

In one aspect, a color imaging system includes image-forming optics, a sensor array and a processing module. The processing module includes a color registration module and a spatially-varying sharpening filter. The image-forming optics suffers from lateral chromatic aberration. For example, at the edge of the optical image, each color channel may be misregistered with respect to the spectrally adjacent color channel by at least three, four or even five effective pixel pitches. The sensor array captures color pixels of the chromatically aberrated optical image. The spatially-varying sharpening filter sharpens the image (e.g., reduces the blurring caused by lateral color), and the color registration module realigns different color channels of the image.

Different architectures are possible for the processing module. For example, sharpening of the image may occur before or after registration of the color channels. These operations may also be performed on some, all, or less than all of the component channels that make up the image. The component channels may be all color channels (e.g., an image consisting only of R,G,B color channels) or may include non-color channels (e.g., a white channel, or a luminance channel). The operations may also be performed on the component channels captured by the sensor array (which will be referred to as native component channels), or on other component channels if the native channels are converted to a different format.

The spatially-varying sharpening filter can also take different forms. For example, it can filter just one component channel or it can filter multiple component channels. If multiple channels are filtered, the same filter kernel can be applied to each channel, or a different filter kernel can be used for each channel. In one approach, the image is divided into tiles and the spatially-varying sharpening filter is spatially-invariant within each tile but may vary from tile to tile. For circularly symmetric systems, tiling in polar coordinates can be advantageous. One specific type of spatially-varying sharpening filter is the spatially-varying Wiener filter.

The spatially-varying sharpening filter preferably enhances lower contrast spatial frequencies. For these systems, spatial frequencies that are relatively low compared to the diffraction limit are often significantly degraded, so the spatially-varying sharpening filter preferably has higher gain at these frequencies. In addition, spatial frequencies that are oriented along a tangential direction (as opposed to the sagittal direction) will often be degraded due to the lateral color. Thus, the spatially-varying sharpening filter preferably has higher gain at these frequencies. In addition, the blurring of these tangentially-oriented spatial frequencies due to lateral color generally will increase for points farther away from the optical axis, so the gain of the spatially-varying sharpening filter preferably will also increase accordingly.

As mentioned above, lateral color can be a significant problem for wide angle systems (e.g., systems with a full field of view of at least 120 degrees) and for inherently dispersive systems (e.g., systems that contain at least one element with an effective Abbe number less than 35, including diffractive systems which have negative Abbe numbers). Thus, the approaches described above can be applied to these systems.

Other aspects of the invention include applications and components for the technology described above, and methods corresponding to all of the foregoing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
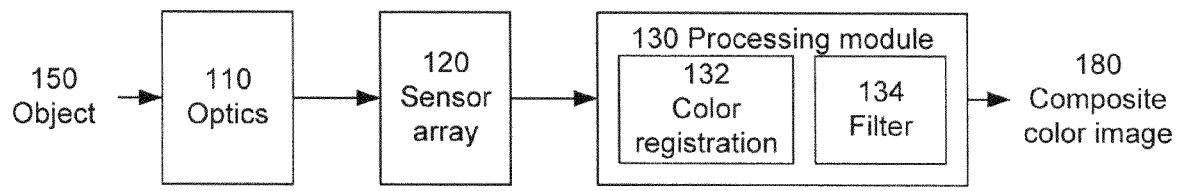
FIG. 1 is a block diagram of a color imaging system according to the invention.

FIG. 1 is a block diagram of a color imaging system according to the invention. The system includes image-forming optics 110 (e.g., a lens assembly), a sensor array 120 (e.g., CCD detector array) and a processing module 130 (e.g., typically implemented in dedicated chips and/or software). The processing module 130 includes a color registration module 132 and a spatially-varying sharpening filter 134. The color imaging system produces a composite color image 180 of an object 150. The image 180 is composite in the sense that different "channels" (possibly including both color and non-color channels) are combined to form the image.

Figure 2:
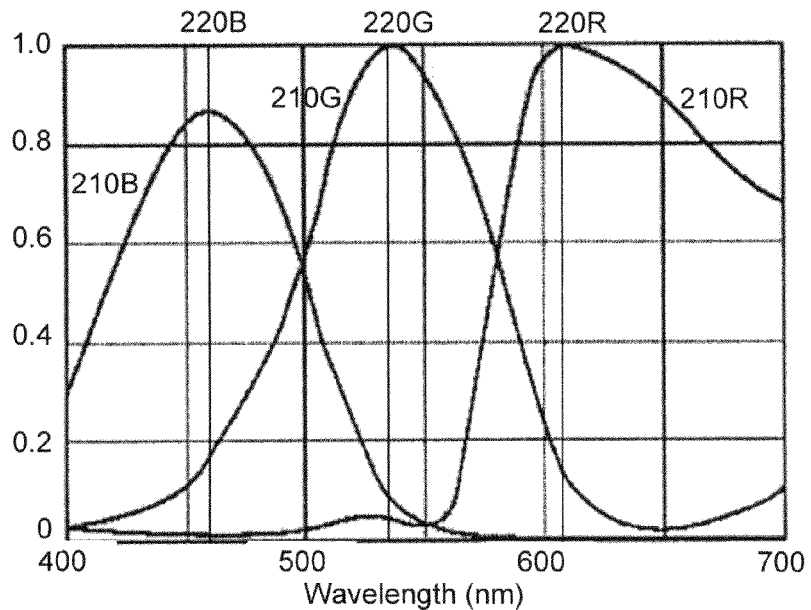
FIG. 2 is a graph showing spectral responses for R, G and B color bands.

The sensor array 120 may include individual sensors that are sensitive to different color bands. For example, a VGA sensor array typically includes individual sensors that are sensitive to R, G or B color bands. FIG. 2 is a graph showing the spectral responses 210R, 210G and 210B for R, G and B color bands. Each of the color bands 210R, 210G and 210B has a peak wavelength 220R, 220G or 220B, respectively. The sensor array 120 produces different data streams for each color band. These data streams will be referred to as color channels. The color channels produced by the sensor array 120 will be referred to as native color channels (as opposed to other color channels, for example as may be produced by converting the native color channels to a different format).

There may also be non-color channels. For example, if the sensor array 120 included individual sensors that were not color-specific (e.g., "white" pixels), then the resulting data stream would be a native non-color channel. The term "component channels" will be used to refer to both color and non-color channels. "Native component channels" will be used to refer to component channels produced by the sensor array 120.

The individual sensors in sensor array 120 typically are arranged in a geometrical pattern. The Bayer pattern is a 2×2 pattern of sensor elements that includes two Green sensor elements, one Red sensor element and one Blue sensor element for each color pixel of the image. Another four-element pattern includes one Green, one Red, one Blue and one White sensor element for each color pixel. Regardless of the specific arrangement, the sensor array 120 captures color pixels that are made up of different component channels, some of which are color channels.

The arrangement of sensor elements in the sensor array 120 will determine an effective pitch for the color pixels, which will be referred to as the effective color pixel pitch or the effective pixel pitch. The effective pixel pitch can be determined as follows. The effective pixel area is the total area covered by all sensors (including dead space between active sensor areas) divided by the total number of color pixels (or the equivalent number of color pixels for sensors where color pixels are not well defined). The effective pixel pitch is the square root of the effective pixel area. The effective pixel pitch may or may not correspond to the physical dimensions of the sensor array, which typically may range from 1.7 μm to 15 μm wide individual sensors.

For example, consider a VGA sensor with individual square sensors that are on a 4 μm pitch using a Bayer color pattern. There are 640×480 sensors, for a total sensor area of 640×480×4×4=4,915,200 μm$^2$. Four sensors are used to form one color pixel, so there are 320×240=76,800 color pixels. This yields an effective pixel area of 4,915,200 μm$^2$/76,800=64 μm$^2$ and an effective pixel pitch of 8 μm.

Similar quantities can be calculated for each component channel. These will be referred to as the effective color-specific pixel area and the effective color-specific pixel pitch, or as the effective Red pixel area and the effective Red pixel pitch for the Red channel for example. In the VGA example, the effective Red pixel pitch and the effective Blue pixel pitch are both 8 μm since there is only one Red sensor and one Blue sensor per color pixel. However, the effective Green pixel pitch is 5.7 μm since there are two Green sensors per color pixel. These quantities can also be used to determine an effective sampling rate for each channel, and for the sensor as a whole.

In conventional systems, the image-forming optics is designed to correct for lateral color. However, in FIG. 1, the image-forming optics 110 is not well corrected and suffers from significant lateral chromatic aberration. Thus, the optical image formed by optics 110 will exhibit lateral color artifacts.

Figures 3A, 3B, 3C:
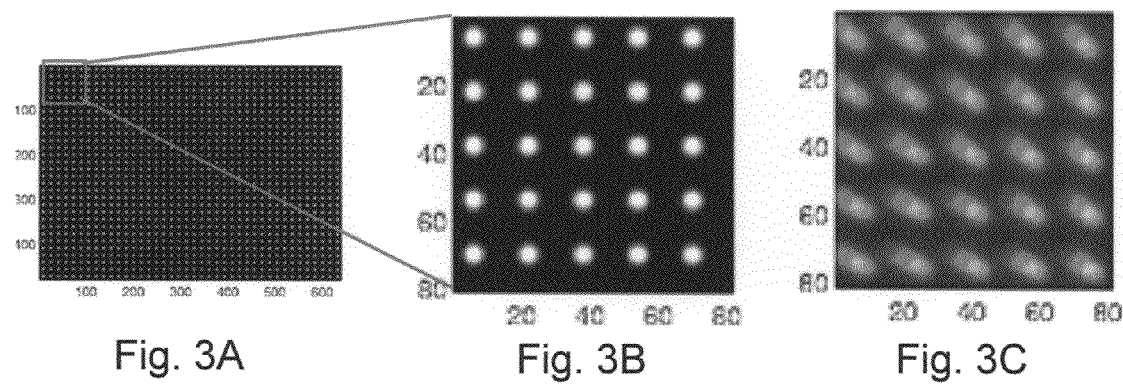
FIGS. 3A-3C are color images illustrating the effect of lateral chromatic aberration.

FIGS. 3A-3C are color images illustrating the effect of lateral chromatic aberration. FIG. 3A shows an ideal image of an array of white spots, without lateral color. FIG. 3B zooms into the upper left edge of FIG. 3A. Different colors are well registered to each other so the spots all look white. FIG. 3C shows an image with lateral color.

Lateral color produces two main types of artifacts in images containing multiple color channels. First, a wavelength-dependent magnification factor causes a different scaling between the color channels producing objectionable color fringes. In FIG. 3C, the wavelength-dependent magnification causes the red, green and blue channels of the white spot to be misregistered with respect to each other. The wavelength-dependent magnification is most pronounced at the edges of the image.

The second artifact is a lateral blurring artifact due to the spectral weighting associated with each color channel. The lateral color spreads the spectral information out in the tangential (as opposed to sagittal) direction at the periphery of the image. Thus, while a single color channel will not have the same lateral extent as the entire smearing shown in FIG. 3C, each color channel will experience some smearing (i.e., blurring) according to the spectral weighting of the corresponding color band.

Figures 4A, 4B:
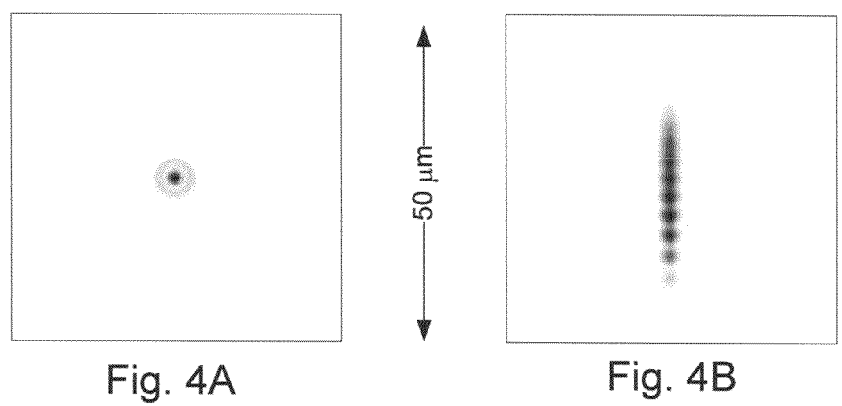
FIGS. 4A and 4B are polychromatic point spread functions (PSFs) for on-axis and at a field of 89 degrees, respectively, for the red channel, out to the effective sampling rate for the red channel of 50 lp/mm.

Another way to observe these effects is to consider the polychromatic point spread function (PSFs) or modulation transfer function (MTF) of the optics 110. FIGS. 4A and 4B are polychromatic PSFs for an optics with significant lateral color. These polychromatic PSFs are determined by calculating the PSFs for twelve different wavelengths around the peak wavelength of approximately 620 nm for the R color band weighted by the spectral weighting similar to that shown in FIG. 2 for the red channel with an IR cutoff filter. FIG. 4A shows the on-axis PSF. Since the lateral color is non-existent on-axis, the red polychromatic PSF is very sharp. However, FIG. 4B shows the off-axis PSF at a field of 89 degrees. The spread in the tangential (polar radial) direction is obvious. A broadband object without further correction would suffer from significant tangential loss in resolution.

As stated previously, the image-forming optics 110 in FIG. 1 suffers from significant lateral color. In conventional systems, the lateral color will be corrected so that different color images will be well registered to each other. However, in FIG. 1, the lateral color causes different color images to be misregistered.

As one quantitative measure, consider the amount of misregistration at the peak wavelengths of the different color bands. The image at peak wavelength 210R will be misregistered by some amount with respect to the image at peak wavelength 210G, which will be misregistered by some amount with respect to the image at peak wavelength 210B. In some systems, the images of spectrally adjacent color bands are misregistered at their peak wavelengths by at least two effective pixel pitches along a tangential direction at the edge of the sensor array.

In other words, at the full field, the center of the spot at peak wavelength 210R is at least two effective pixel pitches away from the center of the spot at peak wavelength 210G, as measured along the tangential direction; and the spot at peak wavelength 210G is also at least two effective pixel pitches away from the spot at peak wavelength 210B. Other systems will have different thresholds, for example separations of at least 2.5, 3, 3.5 or even 4 or 5 effective pixel pitches. In comparison, conventional systems correct the lateral color so that the maximum misregistration typically is a fraction of an effective pixel pitch.

The relaxed requirement on lateral color is advantageous because the image-forming optics 110 can be simplified and/or made less expensive. However, the lateral color artifacts are addressed using image processing. In FIG. 1, the color registration module 132 compensates for the misregistration of color channels and the spatially-varying sharpening filter 132 compensates for the blurring.

With respect to color registration module 132, the severe lateral chromatic aberration causes the optical magnification factor to vary considerably between different color channels. Color registration is the process by which different color channels are aligned, typically using image resampling or interpolation. This process is well known and conventional approaches are typically sufficient. In one approach, the color registration module 132 scales different color channels by different amounts in order to register them. Typical applications of these techniques are used to correct lateral color of less than one effective pixel pitch.

With respect to the spatially-varying sharpening filter 134, the severe lateral chromatic aberration causes blurring in the tangential direction. The spatially-varying sharpening filter improves the degraded contrast.

One approach uses spatially-varying Wiener filters to restore image contrast. The Wiener filter provides a balanced trade-off between contrast and signal-to-noise ratio (SNR). The Wiener filter at a particular field location can be written in the Fourier domain as:

$$G_C(\omega_1, \omega_2) = \frac{H_C(\omega_1, \omega_2) * S_{uu}(\omega_1, \omega_2)}{|H_C(\omega_1, \omega_2)|^2 S_{uu}(\omega_1, \omega_2) + S_{nn}(\omega_1, \omega_2)} \quad (1A)$$

where $G_C$ is the frequency response of the Wiener filter, $H_C$ is the polychromatic optical transfer function (OTF), $S_{uu}$ is the power spectral density (PSD) of the image signal, $S_{nn}$ is the PSD of the noise added to the original image, and $(\omega_1, \omega_2)$ are the spatial frequency coordinates. The polychromatic OTF is a combination of the OTFs for different wavelengths according to $$H_C(\omega_1,\omega_2) = \int H(\omega_1,\omega_2,\lambda) w_C(\lambda) d\lambda \quad (1B)$$

where $w_C(\lambda)$ is the spectral sensitivity of the Cth color channel. These quantities can be estimated, approximated or measured in various ways.

Figure 5:
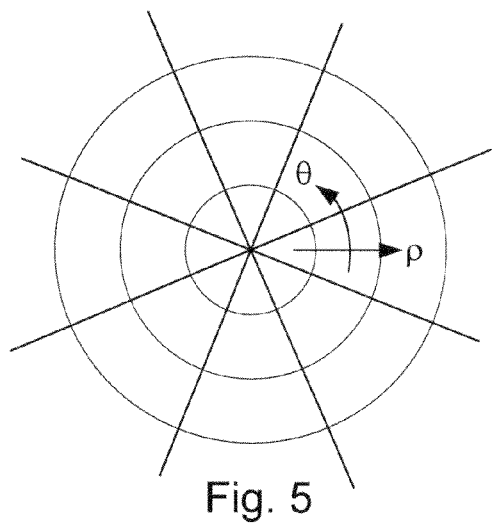
FIG. 5 is a diagram that shows tiling of the spatially-varying sharpening filter in polar coordinates.

Changing the sharpening filter for every pixel can be prohibitively costly. One approach is to divide the image into tiles, where the spatially-varying sharpening filter is spatially-invariant within each tile. If the system is rotationally symmetric, then polar sectors are a natural choice for tile shape. Polar sectors are defined as the region between a min and max radius and between a min and max angle. FIG. 5 is a diagram that shows a tiling of the spatially-varying sharpening filter in polar coordinates. Such a tiling can be used to approximate a continuously varying sharpening filter. The digital filter within each tile is spatially-invariant.

Another implementation may have the digital filter coefficients rotate according to the different values of θ within the tile. For example, assume that the filter kernel is primarily for sharpening along the tangential direction (i.e., along the polar radial coordinate ρ). Then, the filter kernel applied to a pixel with θ=45 degrees preferably is not simply x-y translated to a neighboring pixel with θ=47 degrees. Rather, the filter kernel preferably is also rotated by two degrees so that the primary sharpening now is aligned along θ=47 degrees instead of θ=45 degrees. This type of filter is spatially-invariant with respect to the polar radial coordinate ρ.

The gain of the spatially-varying filter preferably increases with polar coordinate ρ. For example, the spectral gain for the tangential spatial frequencies corresponding to 0.5× Nyquist rate of the effective pixel pitch may increase by a factor of 2× from the optical center (ρ=0) to the edge of the optical field (maximum ρ). Other systems may increase the tangential spectral gain by a factor of 1.5× to as much as 8× depending on the amount of lateral color aberration and the spectral width of the color sensitivity.

Figure 6A:
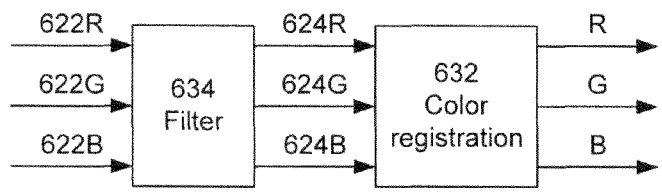
FIGS. 6A-6D are block diagrams of example processing modules according to the invention.
Figure 6B:
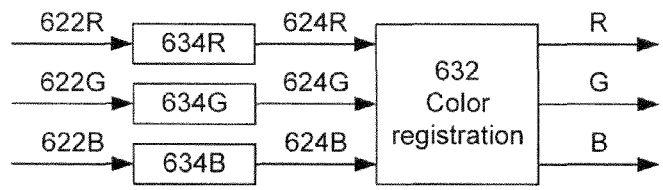
Figure 6C:
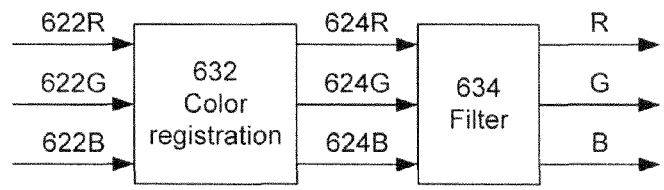
Figure 6D:
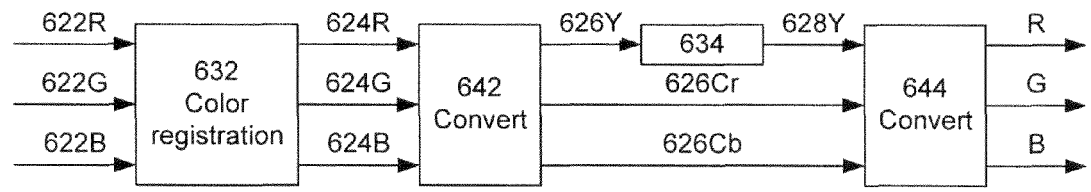

Returning to FIG. 1, FIGS. 6A-6D are block diagrams of different implementations of the processing module 130. First, note that the color registration and sharpening filter could occur in either order. In FIGS. 6A-6B, sharpening is applied before color registration. In FIGS. 6C-6D, color registration is applied before sharpening. The sharpening filter typically will sharpen the image primarily along the tangential direction, at least at the edge of the image.

In addition, note that the same sharpening can be applied to all channels, or the sharpening can be different for different channels. In FIG. 6A, the same sharpening 634 is applied to each of the three native color channels 622R,G,B. If the image is divided into tiles, this means that within each tile the same filter kernel is applied to each of the three color channels. The sharpened color channels 624R,G,B are then registered 632 to each other. In FIG. 6B, different filter kernels 634R,G,B are used to sharpen the native color channels 622R,G,B. That is, the filter kernel applied to the R component of a pixel may be different than that applied to the G component of the same pixel. The sharpened color channels 624R,G,B are then registered 632 to each other.

FIG. 6C is the same as FIG. 6A, except the order of sharpening and registration is reversed. Here, the native color channels 622R,G,B are first registered 632 to each other. The registered channels 624R,G,B are then sharpened 634, using the same filter kernel for each color channel. In another variation, color-specific filter kernels could be used, analogous to FIG. 6B.

FIG. 6D shows an example where the native R,G,B color channels are converted to a different color space (Y,Cr,Cb) and then filtered. In this example, the native color channels 622R,G,B are first registered 632 to each other. The registered channels 624R,G,B are converted 642 to non-native Y,Cr,Cb component channels 626. Note that the luminance Y channel is a non-color channel, but the Cr and Cb chroma channels are color channels. In this example, the spatially-varying sharpening filter 634 is applied only to the luminance channel. The sharpened luminance channel 628Y could be output with the two chroma channels. Alternately, all three channels could be converted 644 back to R,G,B, as shown in FIG. 6D.

Figure 7:
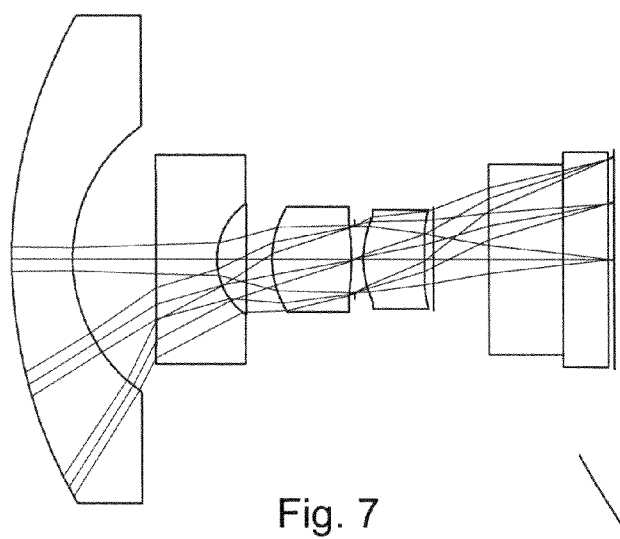
FIG. 7 is a diagram of image-forming optics for an example color imaging system.

FIGS. 7-8 and 9-11 show two specific examples. FIGS. 7-8 illustrate an example of a super wide angle application. This example has a 190 degree full field of view, using a VGA CMOS sensor array with approximately 4 μm pitch for individual sensors. The color pixels are arranged as a 2×2 Bayer pattern of individual sensors, yielding an effective pixel pitch of approximately 8 μm. This particular example is F/2.8 with a focal length of 1.2 mm. The system is a three-color Bayer filter system with spectral weighting similar to the curves shown in FIG. 2.

FIG. 7 is a diagram of the lens system, which uses only four lens elements, plus a glass cover plate. There are two negative elements followed by two positive elements. It achieves a very short total track length of 1 cm by sacrificing lateral color. The design eliminates the negative achromat typically used to reduce lateral color and reduces the curvature of the front lens to minimize the total track length. Table 1 shows the optical prescription of this lens system.

TABLE 1

Optical prescription for the super-wide angle lens system of FIG. 7

| Surface | Type | Curvature | Thickness | Glass | Semi-Diameter |
|---|---|---|---|---|---|
| 0 | STANDARD | 0.00E+00 | 1.00E+10 | | 0.00E+00 |
| 1 | STANDARD | 1.23E−01 | 1.00E+00 | S-TIH6 | 3.88E+00 |
| 2 | STANDARD | 3.70E−01 | 1.37E+00 | | 2.16E+00 |
| 3 | STANDARD | −9.97E−03 | 9.90E−01 | SFN3 | 1.66E+00 |
| 4 | EVENASPH | 8.68E−01 | 4.70E−01 | | 9.01E−01 |
| 5 | STANDARD | 0.00E+00 | 4.30E−01 | | 8.99E−01 |
| 6 | STANDARD | 5.99E−01 | 1.30E+00 | S-PHM52 | 8.62E−01 |
| 7 | STANDARD | −2.07E−01 | 5.00E−02 | | 6.02E−01 |
| 8 | STANDARD | 0.00E+00 | 1.50E−01 | | 5.54E−01 |
| 9 | STANDARD | 5.76E−01 | 1.00E+00 | P-BK40 | 7.00E−01 |
| 10 | EVENASPH | −2.03E−02 | 1.50E−01 | | 8.06E−01 |
| 11 | STANDARD | 0.00E+00 | 9.00E−01 | | 8.41E−01 |
| 12 | STANDARD | 0.00E+00 | 1.22E+00 | | 1.20E+00 |
| 13 | STANDARD | 0.00E+00 | 7.50E−01 | BSL7 | 1.51E+00 |
| 14 | STANDARD | 0.00E+00 | 8.50E−02 | | 1.70E+00 |
| 15 | STANDARD | 0.00E+00 | 0.00E+00 | | 1.74E+00 |

| Surface | Conic | $\rho^4$ | $\rho^6$ | $\rho^8$ |
|---|---|---|---|---|
| 4 | −1.05E+00 | 9.11E−02 | 3.28E−02 | 3.36E−02 |
| 10 | −1.76E+01 | 1.58E−01 | 2.23E−02 | −7.51E−03 |

Figure 8A:
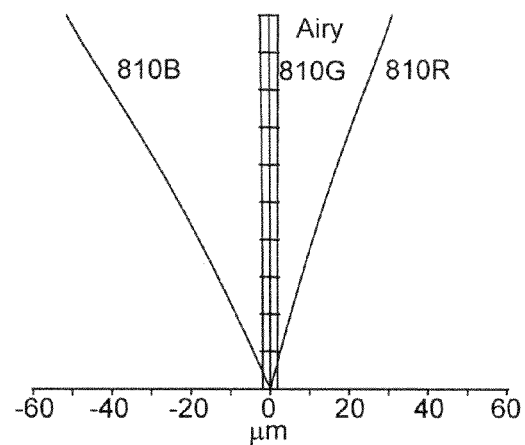
FIGS. 8A-8B are plots of lateral color and polychromatic MTF, respectively, for the color imaging system of FIG. 7.

FIG. 8A shows a plot of lateral color versus field height at three wavelengths. Curves 810R,G,B correspond to wavelengths of 0.620, 0.540, and 0.450 μm. The plot is relative to curve 810G. The plot shows that the gross separation at the edge of the field (approximately 90 degrees full field) between the G color channel and the R color channel corresponds to about 35 μm or approximately 3-4 effective pixel pitches. FIG. 8A also shows the size of the Airy disk for comparison.

Figure 8B:
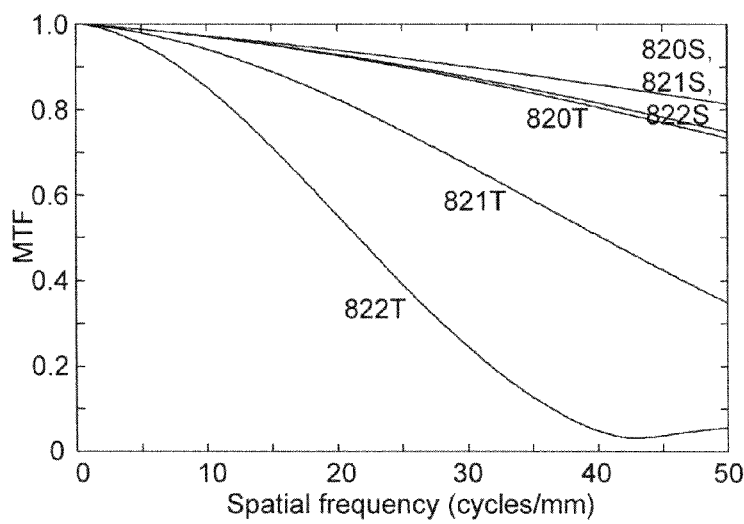

FIG. 8B compares the sagittal and tangential polychromatic MTF curves using a weighted combination of nine wavelengths around the center green wavelength of 540 nm. MTFs 820, 821 and 822 are for the half field angles of 0, 25, and 45 degrees respectively. The "S" suffix indicates sagittal and "T" indicates tangential. The sagittal contrast 820S, 821S, 822S is nearly equal at all three field angles. The tangential contrast 820T, 821T, 822T, however, degrades significantly as the field angle increases due to the lateral color of the system.

The effects of lateral color are compensated by the color registration module and the spatially-varying sharpening filter. This example uses the architecture shown in FIG. 6D. Furthermore, the Wiener filter of Eqn. 1 is used to sharpen the Y luminance channel only. For purposes of this simulation, the additive noise power spectral density (PSD) is assumed flat with power $\sigma_n^2$ over the entire image. For the signal PSD model, assume the following simple model $$PSD(\omega_1, \omega_2) = \frac{\sigma_S^2}{(1 + c_1^2 - 2c_1(1 - \omega_1^2))(1 + c_2^2 - 2c_2(1 - \omega_2^2))} \quad (2)$$

where $c_1$ and $c_2$ are image correlation coefficients and $\sigma_s^2$ is a parameter which controls the signal power.

The image is tiled into polar sectors, using ten radial segments and sixteen angular segments for a total of 160 tiles. The point spread function (PSF) within each tile is approximated by $$h_{i,j}(x, y) = ke^{-\frac{1}{\lambda}\left[(x\cos\theta_j - y\sin\theta_j)^2 + \frac{1}{1+\gamma\rho_i^2}(x\sin\theta_j + y\cos\theta_j)^2\right]^{\frac{1}{2}}} \quad (3)$$

where $h_{i,j}(x,y)$ is the PSF function for the tile with center $(\rho_i, \theta_j)$, k is the normalizing factor, λ controls the size of the rotationally symmetric blur and γ controls the amount of blur in the tangential direction. The filters are spatially-invariant within each tile. The tiling approximates the continuously varying spatial variation. In this form, the PSF becomes elliptical in the tangential direction increasing linearly in terms of the radial coordinate ρ. This PSF model provides a simple approximation to the linear wavelength-dependent magnification change due to lateral chromatic aberration. These quantities are applied to Eqn. 1 to derive the Wiener filter for each tile. More sophisticated filters will depend on the optical properties of the system and can be computed from an optical prescription or from physical measurements of the polychromatic OTF.

Figure 9:
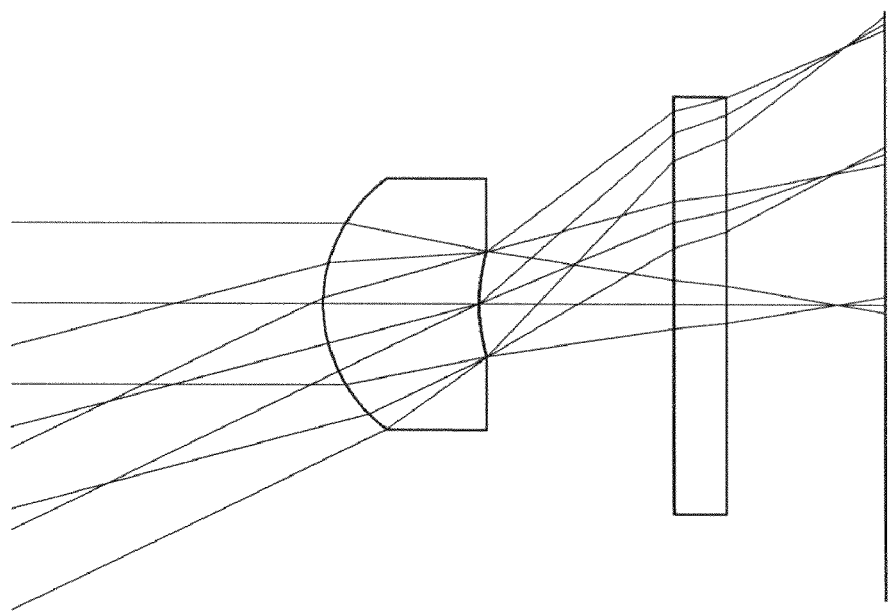
FIG. 9 is a diagram of image-forming optics for another example color imaging system.
Figure 10:
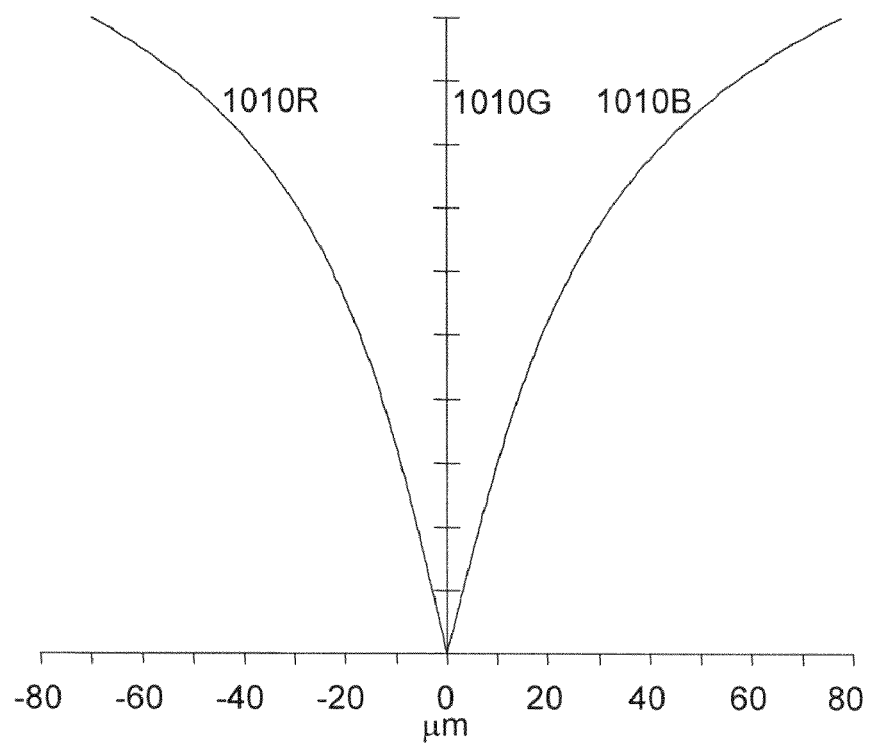
FIG. 10 is a plot of lateral color for the color imaging system of FIG. 9.

FIGS. 9-11 illustrate another example using a diffractive optical element. This example is a 40 degree full field of view system, also using a VGA CMOS sensor array with approximately 4 μm pitch individual sensors. It has a focal length of 5.5 mm and is F/2.65. The optical system is shown in FIG. 9, with the optical prescription shown in Table 2. Surface 4 is the diffractive optical element.

TABLE 2

Optical prescription for the DOE system of FIG. 9

| Surface | Type | Curvature | Thickness | Glass | Semi-Diameter | Diffraction Order |
|---|---|---|---|---|---|---|
| 0 | STANDARD | 0.00E+00 | 1.00E+10 | | 0.00E+00 | |
| 1 | STANDARD | 0.00E+00 | 3.00E+00 | | 2.49E+00 | |
| 2 | STANDARD | 6.60E−01 | 1.50E+00 | BK7 | 1.19E+00 | |
| 3 | STANDARD | 5.38E−01 | 1.88E+00 | | 5.68E−01 | |
| 4 | BINARY_1 | 0.00E+00 | 5.00E−01 | BK7 | 1.34E+00 | 1.00E+00 |
| 5 | STANDARD | 0.00E+00 | 1.53E+00 | | 1.43E+00 | |
| 6 | STANDARD | 0.00E+00 | 0.00E+00 | | 2.16E+00 | |

| Surface | # terms | Norm Radius | $x^2$ | $y^2$ | $x^4$ | $y^4$ |
|---|---|---|---|---|---|---|
| 4 | 2.70E+01 | 5.00E+00 | −9.59E+03 | −9.59E+03 | −4.08E+03 | −4.08E+03 |

| | $x^6$ | $y^6$ |
|---|---|---|
| 4 | −9.17E+04 | −9.17E+04 |

It is a single spherical plastic lens element, followed by a diffractive optical element (DOE) to correct field curvature. The DOE enables a very short total track length and could be manufactured directly onto the cover glass of the sensor. Using a DOE in this fashion, however, introduces significant lateral color artifacts. This is an example where the inherent dispersiveness causes significant lateral color, whereas the previous example was a case where the wide field of view caused significant lateral color. The spatially-varying sharpening filter was implemented using the architecture of FIG. 6B.

FIG. 10 is a plot of the lateral color between the three color channels, shown out to 26 degrees half field of view. Curves 1010R,G,B correspond to wavelengths of 0.620, 0.540, and 0.450 µm. The magnitude of the lateral color out to the working field angle of plus or minus 20 degrees shows approximately the same lateral color as that of the wide angle imaging system.

Figure 11A:
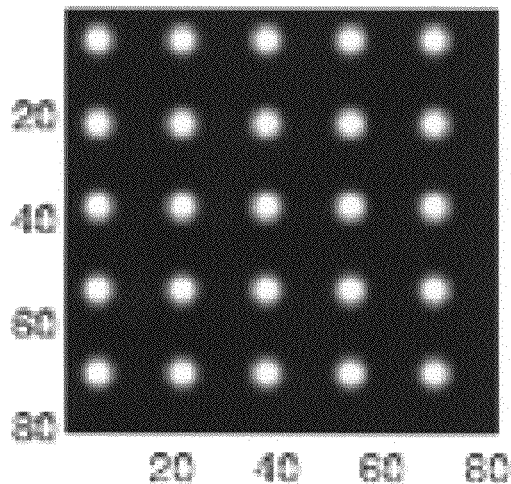
FIGS. 11A-D are color images illustrating the capabilities of the color imaging system of FIG. 9.
Figure 11B:
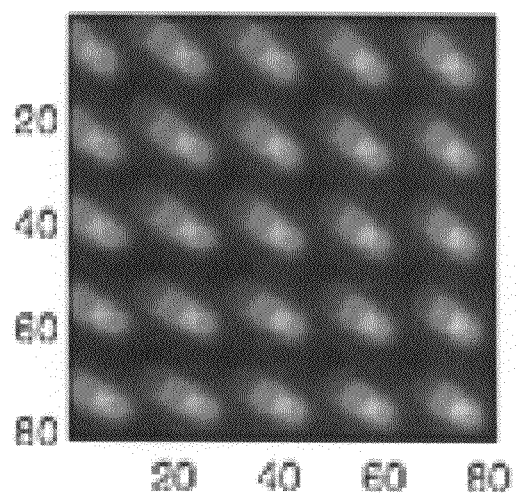
Figure 11C:
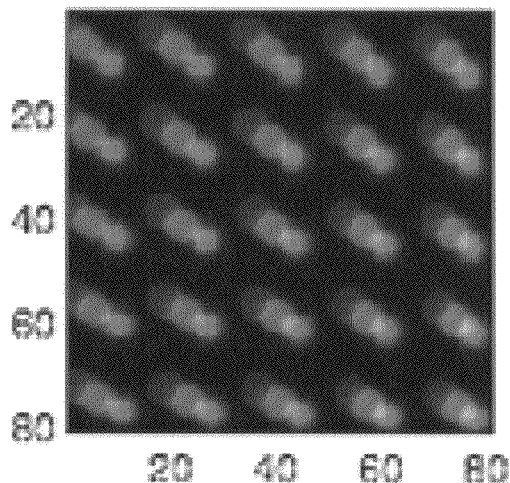
Figure 11D:
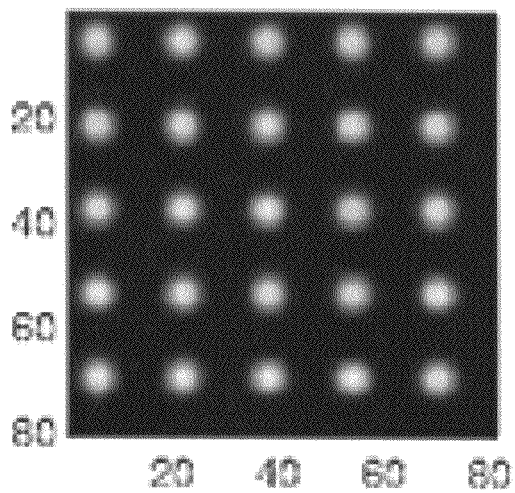

FIGS. 11A-D are color images illustrating the performance of this system. A simple test object consisting of a grid of white light sources was used for this simulation. The images in FIG. 11 show only the upper left portion of the test image where the lateral color artifacts are most severe. FIG. 11A shows the ideal image. FIG. 11B shows the image captured by the sensor array. The captured image shows noise artifacts as well as the gross misregistration between the three color channels. FIG. 11C shows the image after applying the spatially-varying Wiener filtering to the color channels. The points are sharpened considerably, but remain unregistered. FIG. 11D shows the final image after performing color registration, in this case also followed by demosaicing.

Although the detailed description contains many specifics, these should not be construed as limiting the scope of the invention but merely as illustrating different examples and aspects of the invention. It should be appreciated that the scope of the invention includes other embodiments not discussed in detail above. For example, processing in addition to spatially-varying sharpening filters and color registration can also be applied. Demosaicing and residual distortion correction are two examples. The invention also is not limited to the visible wavelength range, RGB sensor arrays or RGB color channels. Infrared (both purely infrared and combined visible/infrared) and multi-spectral imagers are two examples.

In addition, the term "module" is not meant to be limited to a specific physical form. Depending on the specific application, modules can be implemented as hardware, firmware, software, and/or combinations of these. For example, the modules can be implemented as software, typically running on digital signal processors or even general-purpose processors. Various combinations can also be used. For example, certain operations, like the FFT, inverse FFT, and application of a filter kernel may be common enough as to be available as standard components, software, or circuit designs. These may be combined with customized implementations of the remainder of the module. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A color imaging system for producing a composite color image of an object, the color imaging system comprising:
   image-forming optics that form a chromatically aberrated optical image of the object;
   a sensor array positioned to capture color pixels of the chromatically aberrated optical image, the sensor array having an effective pixel pitch for the color pixels of less than approximately 30 µm, the color pixels comprising native color channels that correspond to different color bands within the chromatically aberrated optical image, each color band having a peak wavelength, wherein spectrally adjacent color bands are misregistered at their peak wavelengths by at least two effective pixel pitches along a tangential direction at the edge of the sensor array; and a processing module communicatively coupled to the sensor array for producing a composite color image from the native color channels, the processing module including:

a color registration module that registers different color channels of the image to each other; and a spatially-varying sharpening filter that sharpens at least one component channel of the image.

2. The color imaging system of claim 1 wherein the at least one component channel is sharpened before the different color channels are registered.

3. The color imaging system of claim 1 wherein the different color channels are registered before the at least one component channel is sharpened.

4. The color imaging system of claim 1 wherein the image is divided into tiles and the spatially-varying sharpening filter is spatially-invariant within each tile but may vary from tile to tile.

5. The color imaging system of claim 4 wherein the tiles are polar sectors.

6. The color imaging system of claim 1 wherein the spatially-varying sharpening filter is a spatially-varying Wiener filter.

7. The color imaging system of claim 1 wherein, at the edges of the image, the spatially-varying sharpening filter sharpens the image primarily along the tangential direction.

8. The color imaging system of claim 1 wherein a normalized gain of the spatially-varying sharpening filter for a tangential spatial frequency equal to 0.5× the Nyquist rate of the effective pixel pitch is at least two times greater at an edge of the sensor array compared to on-axis.

9. The color imaging system of claim 1 wherein the image includes a plurality of component channels and the spatially-varying sharpening filter sharpens fewer than all of the component channels.

10. The color imaging system of claim 1 wherein the spatially-varying sharpening filter sharpens at least one of the native color channels.

11. The color imaging system of claim 1 wherein the sensor array captures a plurality of native component channels that include the native color channels, and the spatially-varying sharpening filter sharpens at least one component channel that is not a native component channel.

12. The color imaging system of claim 1 wherein the spatially-varying sharpening filter applies a same sharpening to all color channels.

13. The color imaging system of claim 1 wherein the spatially-varying sharpening filter applies different sharpening to different color channels.

14. The color imaging system of claim 1 wherein the processing module further comprises:

a distortion correction module for correcting distortion in the image.

15. The color imaging system of claim 1 wherein the processing module further comprises:

a demosaicing module for demosaicing the image.

16. The color imaging system of claim 1 wherein the processing module further comprises:

a non-linear filtering module for enhancing edges in the image.

17. The color imaging system of claim 1 wherein the image-forming optics consists of refractive lenses.

18. The color imaging system of claim 1 wherein the image-forming optics includes at least one diffractive optical element.

19. The color imaging system of claim 1 wherein the color imaging system has a full field of view of at least 120 degrees.

20. The color imaging system of claim 1 wherein the sensor array is a VGA sensor array.

21. The color imaging system of claim 1 wherein the native color channels are R, G and B color channels.

22. The color imaging system of claim 1 wherein the sensor array captures a plurality of native component channels that include R, G and B color channels and a white non-color channel.

23. The color imaging system of claim 1 wherein at least one peak wavelength of a color band is greater than 900 nm.

24. The color imaging system of claim 1 wherein the sensor array is a multi-spectral sensor array.

25. A color imaging system for producing a composite color image of an object, the color imaging system comprising:

image-forming optics that form a chromatically aberrated optical image of the object;

a sensor array positioned to capture color pixels of the chromatically aberrated optical image, the sensor array having an effective pixel pitch for the color pixels, the color pixels comprising native color channels that correspond to different color bands within the chromatically aberrated optical image, each color band having a peak wavelength, wherein spectrally adjacent color bands are misregistered at their peak wavelengths by at least two effective pixel pitches along a tangential direction at the edge of the sensor array; and a processing module communicatively coupled to the sensor array for producing a composite color image from the native color channels, the processing module including:

a color registration module that registers different color channels of the image to each other, wherein the color registration module scales the different color channels to register them to each other; and a spatially-varying sharpening filter that sharpens at least one component channel of the image.

26. A color imaging system for producing a composite color image of an object, the color imaging system comprising:

image-forming optics that form a chromatically aberrated optical image of the object;

a sensor array positioned to capture color pixels of the chromatically aberrated optical image, the sensor array having an effective pixel pitch for the color pixels, the color pixels comprising native color channels that correspond to different color bands within the chromatically aberrated optical image, each color band having a peak wavelength, wherein spectrally adjacent color bands are misregistered at their peak wavelengths by at least two effective pixel pitches along a tangential direction at the edge of the sensor array; and a processing module communicatively coupled to the sensor array for producing a composite color image from the native color channels, the processing module including:

a color registration module that registers different color channels of the image to each other; and a spatially-varying sharpening filter that sharpens at least one component channel of the image;

wherein the color imaging system contains an optical element with Abbe number less than 35.

* * * * *